(12) United States Patent
Seki et al.

(10) Patent No.: US 11,988,282 B2
(45) Date of Patent: May 21, 2024

(54) CHAIN TENSIONER

(71) Applicant: DAIDO KOGYO CO., LTD., Ishikawa (JP)

(72) Inventors: Hideaki Seki, Ishikawa (JP); Kota Tanaka, Ishikawa (JP); Hiroaki Oku, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 428 days.

(21) Appl. No.: 17/319,262

(22) Filed: May 13, 2021

(65) Prior Publication Data

US 2021/0262552 A1  Aug. 26, 2021

Related U.S. Application Data

(63) Continuation of application No. PCT/JP2019/042248, filed on Oct. 29, 2019.

(30) Foreign Application Priority Data

Nov. 14, 2018  (JP) .................................. 2018-214186

(51) Int. Cl.
*F16H 7/08*  (2006.01)

(52) U.S. Cl.
CPC .......... *F16H 7/08* (2013.01); *F16H 2007/081* (2013.01); *F16H 2007/0842* (2013.01); *F16H 2007/0872* (2013.01); *F16H 2007/0893* (2013.01); *F16H 2007/0897* (2013.01)

(58) Field of Classification Search
CPC ................ F16H 7/08; F16H 2007/081; F16H 2007/0842; F16H 2007/0872; F16H 2007/0893; F16H 2007/0897

USPC ......................................................... 474/111
See application file for complete search history.

(56) References Cited

U.S. PATENT DOCUMENTS

| | | | | |
|---|---|---|---|---|
| 4,923,435 | A | * | 5/1990 | Kadota ................. F16H 7/1227 474/135 |
| 6,416,435 | B1 | * | 7/2002 | Szatkowski ............ F16H 7/129 474/135 |
| 7,611,431 | B2 | * | 11/2009 | Dinca ................... F16H 7/1281 474/135 |

(Continued)

FOREIGN PATENT DOCUMENTS

| | | | | |
|---|---|---|---|---|
| DE | 102016225150 | A1 | * 6/2017 | ............... F16H 7/08 |
| DE | 112017008106 | | 7/2020 | |

(Continued)

OTHER PUBLICATIONS

International Search Report issued Jan. 21, 2020 in International (PCT) Application No. PCT/JP2019/042248.

*Primary Examiner* — Michael R Mansen
*Assistant Examiner* — Stephen A Reed
(74) *Attorney, Agent, or Firm* — Wenderoth, Lind & Ponack, L.L.P.

(57) ABSTRACT

A fixed-side support arm (17) of a torsion coil spring (10) is provided with a locking portion (17*a*) and a pressing portion (17*c*). The locking portion (17*a*) is housed in a recessed spring housing portion (22) provided in a lever (9), and an engaging portion (22*a*) abuts against the locking portion (17*a*) to lock a biasing force of the spring. A pressing force (F) is applied to the pressing portion (17*c*) to remove the locking portion (17*a*) from the spring housing portion (22), thereby releasing the locking by the engaging portion (22*a*).

6 Claims, 13 Drawing Sheets

(56) References Cited

U.S. PATENT DOCUMENTS

| | | | | |
|---|---|---|---|---|
| 7,980,976 | B2 * | 7/2011 | Stepniak | F16H 7/1281 |
| | | | | 474/135 |
| 8,162,787 | B2 * | 4/2012 | Gerring | F16H 7/1281 |
| | | | | 474/133 |
| 8,888,627 | B2 * | 11/2014 | Crist | F16H 7/1218 |
| | | | | 474/135 |
| 2006/0058136 | A1 * | 3/2006 | Mosser | F16H 7/1281 |
| | | | | 474/135 |
| 2008/0058141 | A1 * | 3/2008 | Pendergrass | F16H 7/1218 |
| | | | | 474/135 |
| 2011/0207568 | A1 * | 8/2011 | Smith | F16H 7/1281 |
| | | | | 474/135 |
| 2012/0316018 | A1 * | 12/2012 | Ward | F16H 7/1218 |
| | | | | 474/135 |
| 2013/0130853 | A1 * | 5/2013 | Bohm | B62M 9/124 |
| | | | | 474/80 |
| 2015/0369346 | A1 * | 12/2015 | Sisodia | F16H 7/1209 |
| | | | | 474/135 |
| 2016/0102738 | A1 * | 4/2016 | Von Vopelius-Feldt | |
| | | | | F16H 7/08 |
| | | | | 474/111 |
| 2016/0230853 | A1 * | 8/2016 | Harvey | F16H 7/1281 |
| 2016/0252166 | A1 * | 9/2016 | Noro | F16H 7/08 |
| | | | | 474/111 |
| 2017/0184183 | A1 * | 6/2017 | Noro | F16H 7/08 |

FOREIGN PATENT DOCUMENTS

| | | | | |
|---|---|---|---|---|
| JP | 3280339 | | 5/2002 | |
| JP | 6294845 | | 3/2018 | |
| WO | WO-2015115381 | A1 * | 8/2015 | F02B 67/06 |
| WO | WO-2018086656 | A1 * | 5/2018 | F16B 2/02 |

* cited by examiner

CHAIN TENSIONER

CROSS-REFERENCE TO RELATED APPLICATIONS

This application is a Continuation of International Patent Application No. PCT/JP2019/42248, filed Oct. 29, 2019, which claims the benefit of Japanese Patent Application No. 2018-214186, filed Nov. 14, 2018, both of which are hereby incorporated by reference herein in their entirety.

BACKGROUND OF THE INVENTION

Field of the Invention

The present invention relates to a tensioner that applies tension to a chain, and more particularly, to a chain tensioner that uses a torsion coil spring to apply a torsional biasing force for tension to a tension lever.

Background Art

In a chain transmission device used for driving an auxiliary machine, such as an oil pump or a balancer, of an automatic vehicle engine, a chain tensioner is generally used for removing slack of a chain and preventing the chain from vibration during traveling. The tensioner includes a lever that abuts against the chain, and a torsion coil spring that applies a biasing force for tension of the chain to the lever. When the chain tensioner is attached to the chain, it is necessary to assemble the torsion coil spring in a torsional compressed state, attachment work is troublesome, and the chain tensioner or an engine block may be damaged by assembly in an unreasonable state.

The related art discloses a chain tensioner in which a pin locking hole is provided in a lever, a stopper pin abuts against a support arm of a torsion coil spring on a side where the torsion coil spring abuts against an engine block in a state where the support arm is compressed by a predetermined amount, the pin is inserted into the pin locking hole, and the chain tensioner is attached to a chain in a state where a biasing force of the torsion coil spring is cancelled in the lever (see PTL 1).

CITATION LIST

Patent Literature

PTL 1: U.S. Pat. No. 6,294,845

SUMMARY OF THE INVENTION

In the chain tensioner, the biasing force of the torsion coil spring is not applied when the chain tensioner is assembled to the chain. Therefore, even when problems during assembly can be solved, it is necessary to release the biasing force of the torsion coil spring by pulling out the stopper pin after the chain tensioner is assembled to the chain, and it is necessary to manage the stopper pin which becomes unnecessary. In a worst case, there is a possibility that the chain tensioner does not function due to forgetting to pull out the stopper pin, or that an engine trouble occurs due to dropping of the stopper pin into the engine.

The present invention provides a chain tensioner that solves the above-described problem by receiving a biasing force of a torsion coil spring in a lever without using a stopper pin.

The invention provides a chain tensioner including: a lever (9) including a sliding contact surface (16), which is configured to come into sliding contact with a chain (5), and a boss portion (15); and
a torsion coil spring (10) including a coil portion (18) fitting into the boss portion (15), a fixed-side support arm (17) extending from one end of the coil portion, and a lever-side support arm (19) extending from the other end of the coil portion, in which
when the fixed-side support arm (17) abuts against a contact portion (20) which is a fixing member, the lever-side support arm (19) abuts against a contact surface (21) provided on the lever (9) to apply a biasing force of the torsion coil spring (10) to the lever (9) and apply tension to the chain (5) via the sliding contact surface (16),
the fixed-side support arm (17) of the torsion coil spring (10) includes a locking portion (17a) (17$a_2$) and a pressing portion (17c) (17$c_2$),
the lever (9) includes a spring housing portion (22) (22$_2$) that houses the locking portion, and an engaging portion (22a) (22$a_2$) that locks the locking portion housed in the spring housing portion in a state in which a biasing force is applied, and
a pressing force (F) is applied to the pressing portion (17c) (17$c_2$) so that the locking portion (17a) (17$a_2$) is removed from the spring housing portion (22) (22$_2$) and the locking with the engaging portion (22a) (22$a_2$) is released.

For example, referring to FIGS. 6A to 7E, the chain (5) and the chain tensioner (7) are housed in a chain case (6), and a releasing protrusion (27) is provided on a case cover (25) that covers an open portion of the chain case, and when the chain case (6) is covered with the case cover (25), the releasing protrusion (27) presses the pressing portion (17c) (17$c_2$) to release the locking of the locking portion (17a) (17$a_2$) with the engaging portion (22a) (22$a_2$).

For example, referring to FIGS. 2B, 6B, 6C, 7C, 7D and 7E, the contact portion (20) which is the fixing member has a tapered surface (20b) having a downward gradient toward a side opposite to a pressing direction of the pressing portion (17c) (17$c_2$), and a flat spring contact surface (20a) continuous with a lower end of the tapered surface.

For example, referring to FIGS. 1 to 6C, the locking portion (17a) is formed of a linear portion extending from the coil portion (18) in a tangential manner, the spring housing portion (22) is formed of a recess portion that houses the linear locking portion (17a), and
the pressing portion (17c) is bent from the locking portion and extends beyond the engaging portion (22a) to a side opposite to the spring housing portion (22).

For example, referring to FIGS. 8A to 8E, the locking portion (17$a_2$) is formed of a portion that is obtained by bending a tip end of an extension portion (17f) extending from the coil portion (18) in a tangential manner and extends in an axial direction of the coil portion, the spring housing portion (22$_2$) is formed on a rising surface of a coupling portion (26) that couples an arched portion (8) having the sliding contact surface (16) to the boss portion (15), and
the pressing portion (17$c_2$) is formed of a portion that is obtained by bending a tip end of the locking portion (17$a_2$) beyond the engaging portion (22$a_2$) and extends in a direction away from the coil portion (18).

For example, referring to FIG. 3D, the engaging portion (22a) is formed of a protruding portion that protrudes to cover a spring biasing side of the spring housing portion (22), and the engaging portion is inclined such that a protruding amount of a side surface of the locking portion (17a) in a removal direction decreases in a direction from a tip end toward the coil portion.

The reference numerals in the parentheses are for comparison with the drawings, and have no effect on the description of the claims.

Further features and advantages of the invention will become apparent from the following description with reference to the accompanying drawings. In the accompanying drawings, the same or similar components are denoted by the same reference numerals.

DESCRIPTION OF THE EMBODIMENTS

Figure 1:
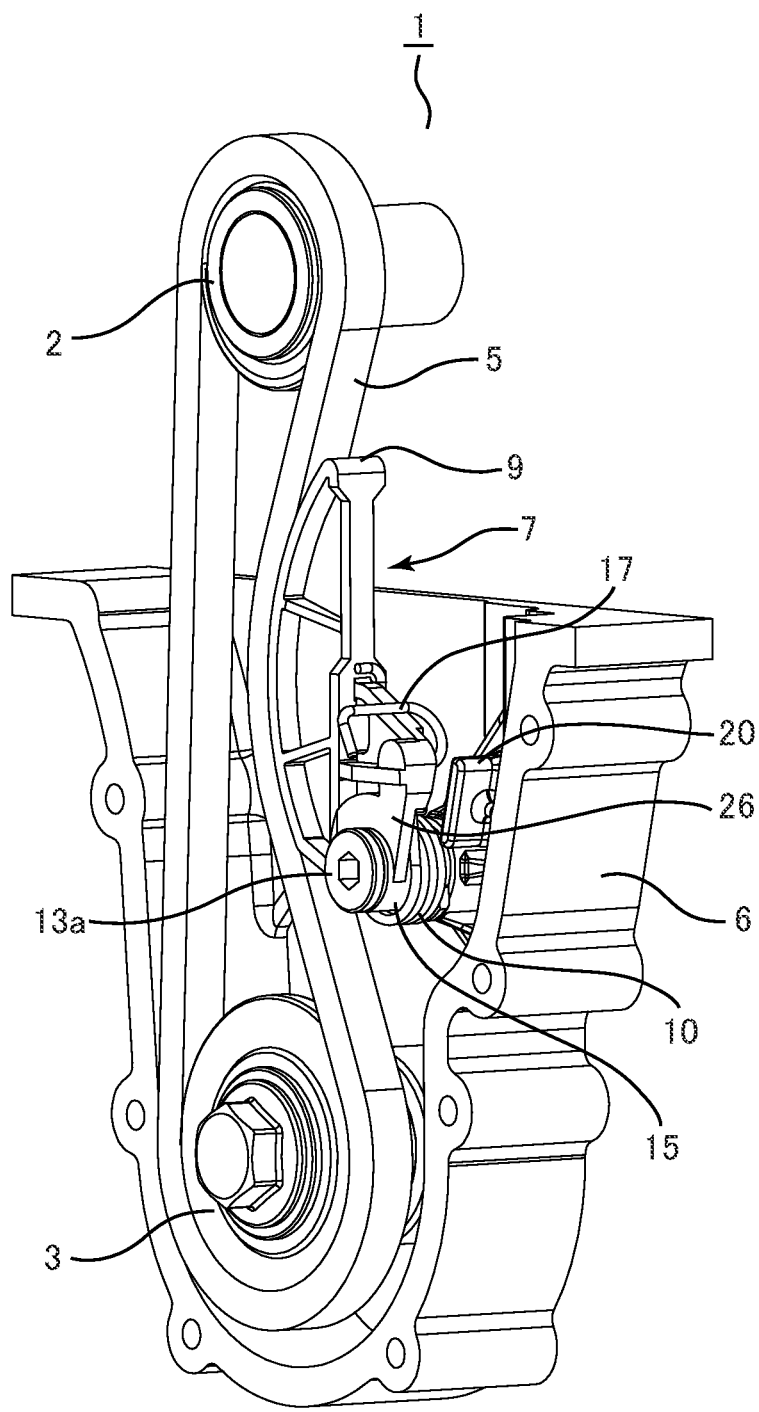
FIG. 1 is a perspective view showing a chain transmission device according to an embodiment of the invention.
Figure 2A:
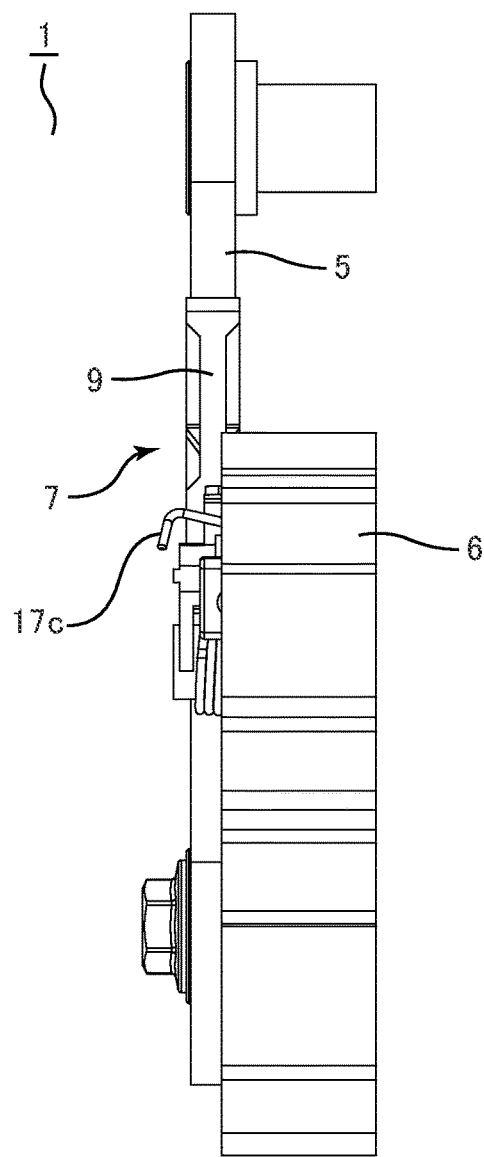
FIG. 2A is a side view of the chain transmission device.
Figure 2B:
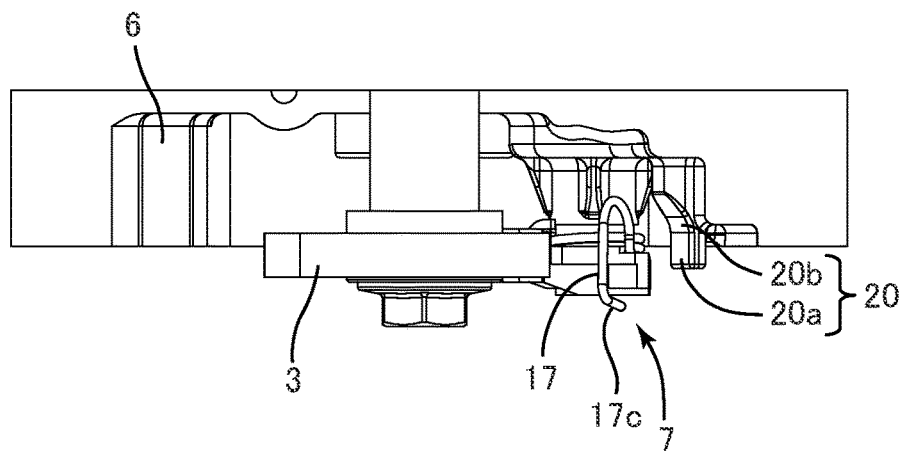
FIG. 2B is a cross-sectional view of the chain transmission device.

Hereinafter, embodiments of the invention will be described with reference to the drawings. As shown in FIGS. 1 to 2B, a chain transmission device 1 according to the present embodiment includes a driving sprocket 2 that is interlocked with an engine crankshaft, a driven sprocket 3 that is interlocked with an auxiliary machine such as an oil pump or a balancer, and a chain 5 that is wound around the two sprockets 2, 3. The chain 5 is generally a roller chain, and may be another chain such as a silent chain. The chain transmission device 1 is housed in a chain case 6 formed of an engine block. A chain tensioner 7 is disposed in the chain case 6.

As shown in FIGS. 3A to 3D, the chain tensioner 7 includes a lever (arm) 9 that is in sliding contact with a slack side of the chain 5, and a torsion coil spring 10 that is compressed between the lever and the chain case 6 and applies a predetermined biasing force to the lever 9. A state shown in FIGS. 1 to 3D is a state in which the torsion coil spring 10 is held in the lever 9 in a torsional compressed state and no biasing force is applied to the chain 5, that is, a state of being delivered to a vehicle manufacturer or the like before the torsion coil spring is released. In FIGS. 1 to 3D (the same applies to other drawings), a side to which the chain case (engine block) 6 opens (a side covered by a chain cover (engine cover) not shown) is referred to as a front surface side, and a bottom side of the chain case 6 is referred to as a back surface side. The lever 9 is formed of a synthetic resin and includes an arched portion 8 having a sliding contact surface 16, a boss portion 15, and a coupling portion 26. The boss portion 15 includes a pivot hole 13, the arched portion 8 has a plurality of reinforcing ribs 14 between the arched sliding contact surface 16 and a linear chord portion 16a, a pivot pin 13a is fitted into the pivot hole 13 penetrating the boss portion 15 to be attached to the chain case 6, the lever 9 is swingably supported, and the arched sliding contact surface 16 is in sliding contact with the chain 5.

As shown in FIGS. 4A to 4D, the torsion coil spring 10 includes a coil portion 18, a support arm 17 extending from a front surface side of the coil portion, and a support arm 19 extending from a back surface side of the coil portion. When the tensioner is in a use state, the support arm 17 on the front surface side abuts against a spring contact portion 20 of the chain case to serve as a fixed-side support arm, and the support arm 19 on the back surface side abuts against a contact portion 21 of the lever 9 to serve as a lever-side support arm. The fixed-side support arm 17 is locked to a spring housing portion 22 of the lever 9 at the time of the delivery (before the spring is released) and cooperates with the lever-side support arm 19 abutting against the lever so that the torsion coil spring 9 is held in the lever 9 in a compressed (twisted) state.

The fixed-side support arm 17 includes a locking portion 17a formed of a linear portion extending from the coil portion 18 in a tangential manner, a relief portion 17b curved from a tip end of the locking portion, and a pressing portion 17c extending from an end of the relief portion in a direction orthogonal to the relief portion and bent at a tip end of the pressing portion. The lever-side support arm 19 includes an extension portion 19a extending linearly from the coil portion 18, and a bent portion 19b bent at a tip end of the extension portion.

Figure 3A:
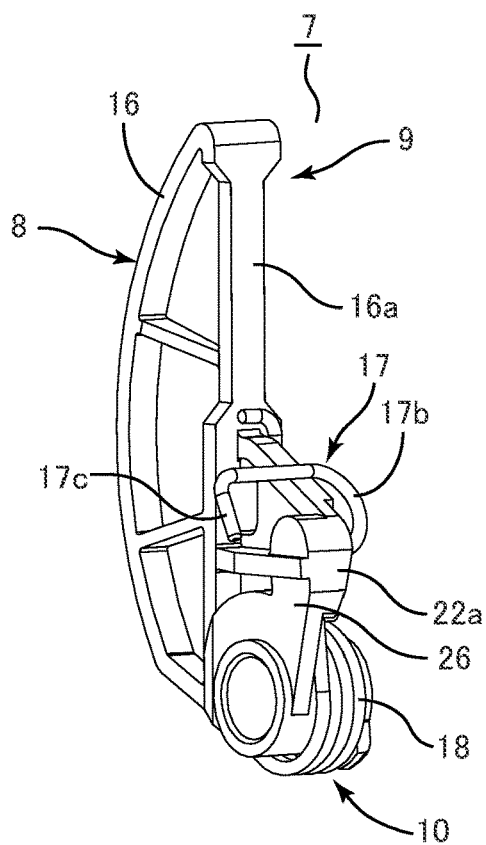
FIG. 3A is a perspective view of a chain tensioner portion of the chain transmission device when viewed from a front surface side.
Figure 3B:
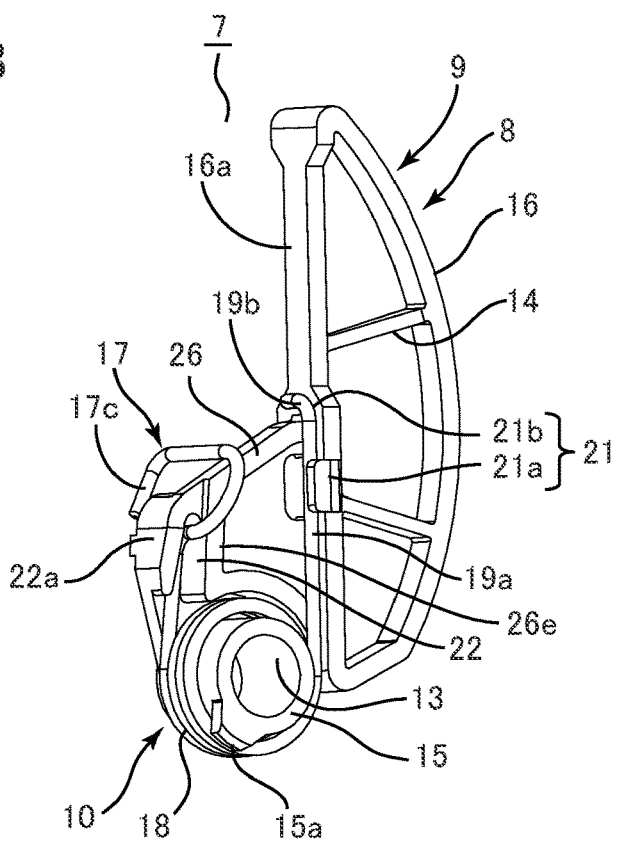
FIG. 3B is a perspective view of the chain tensioner portion of the chain transmission device when viewed from a back surface side.
Figure 3C:
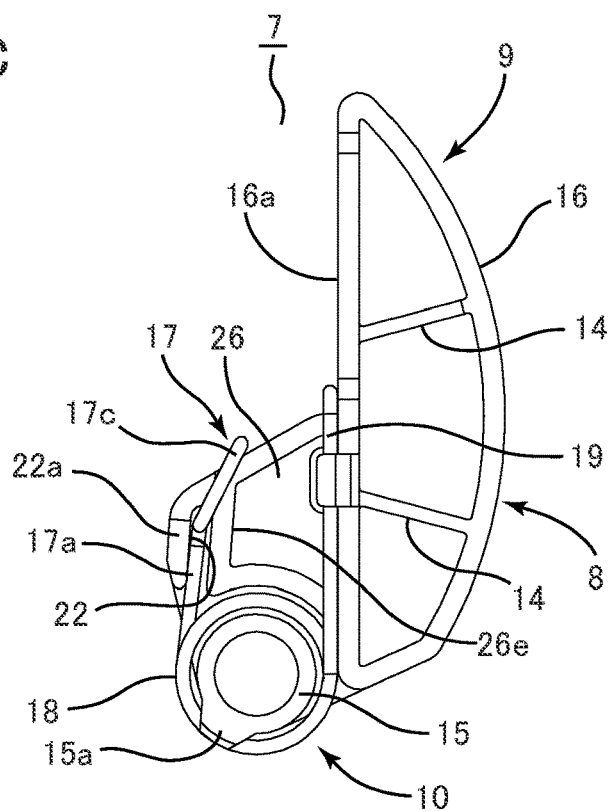
FIG. 3C is a front view of the chain tensioner portion of the chain transmission device when viewed from the back surface side.

As shown in FIGS. 1 and 2B, the contact portion 20 of the chain case 6 protrudes inward on a side surface of the chain case (engine block) 6, and includes a flat spring contact surface 20a that abuts against the fixed-side support arm 17 of the torsion coil spring 9 during use, and a tapered surface 20b that is positioned such that the support arm 17 abuts against the contact surface 20a during a spring release operation. That is, the tapered surface 20b has a downward gradient toward a side opposite to a pressing direction toward the pressing portion 17c. The spring contact surface 20a is formed of a flat surface that is continuous with a lower end of the downward gradient and is parallel to an axial direction of the coil portion. As shown in FIGS. 3B and 3C, the contact portion 21, against which the lever-side support arm 19 abuts, includes a spring outer stop portion 21a that is formed on the linear portion 16a, which is a chord portion opposite to the sliding contact surface 16 of the arched portion 8 of the lever 9, and includes a protruding portion through which the extension portion 19a of the support arm 19 passes between the spring outer stop portion 21a and the coupling portion 26, and an abutting portion 21b that abuts against a tip end of the bent portion 19b and extends along a tip end rising portion of the coupling portion 26.

Figure 3D:
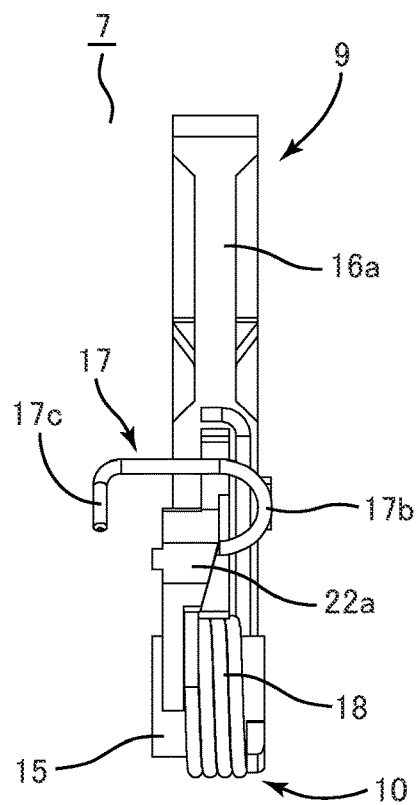
FIG. 3D is a bottom view of the chain tensioner portion of the chain transmission device.
Figure 4A:
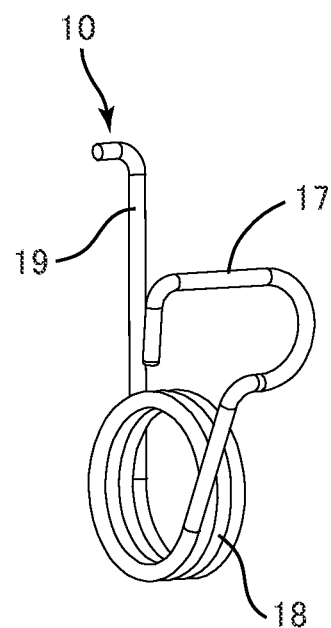
FIG. 4A is a perspective view of a torsion coil spring of the chain tensioner when viewed from a back surface side.
Figure 4B:
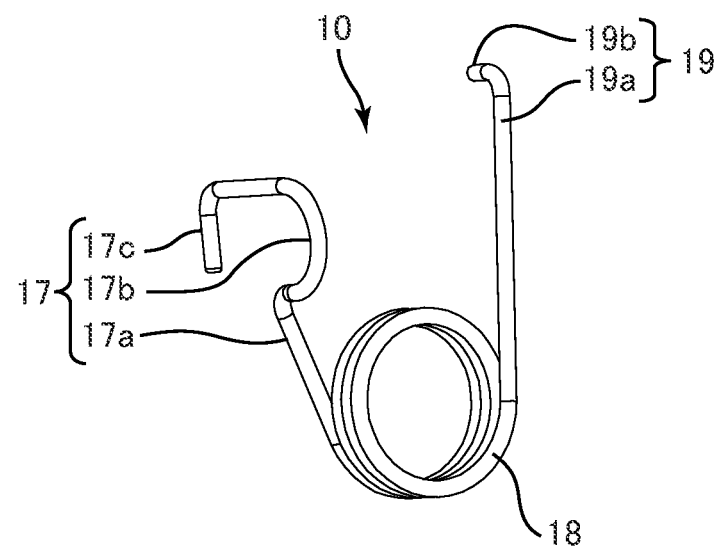
FIG. 4B is a perspective view of the torsion coil spring of the chain tensioner when viewed from a front surface side.
Figure 4C:
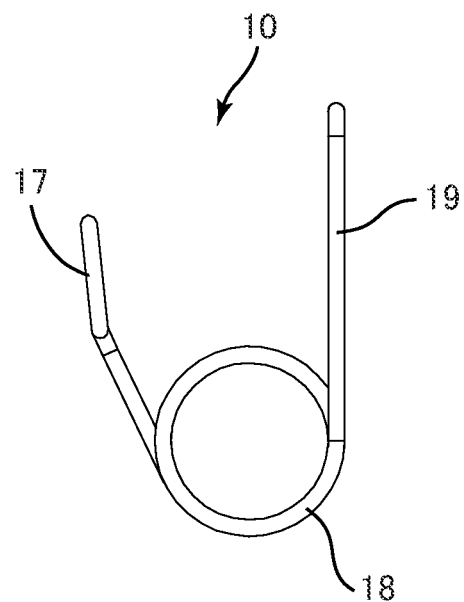
FIG. 4C is a front view of the torsion coil spring of the chain tensioner when viewed from the back surface side.
Figure 4D:
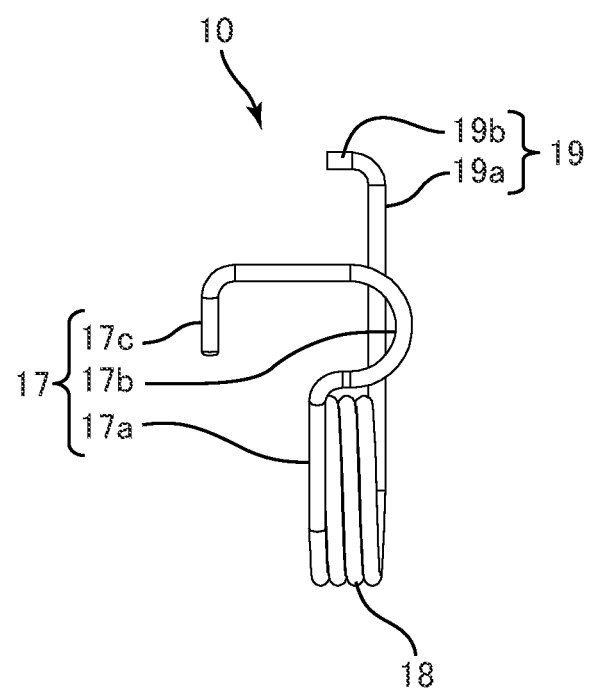
FIG. 4D is a bottom view of the torsion coil spring of the chain tensioner.

The coil portion 18 of the torsion coil spring 10 is wound around an outer periphery of the boss portion 15 of the lever 9, and is supported by the lever 9. As shown in FIGS. 3A to 3D, a spring outer stop portion 15a is formed at a tip end portion of an outer peripheral surface of the boss portion 15 and a part thereof protrudes in a radially outer direction. The outer stop portion prevents the coil portion 18 from coming off from the boss portion 15. The coupling portion 26 of the lever 9 couples the linear portion 16a, which is the chord portion of the arched portion 8, to the boss portion 15, and includes a flat plate on the front surface side. The boss portion 15 is formed on the flat plate, and a rib 26e protrudes from the flat plate toward a back surface. An engaging portion 22a protruding to the back surface side is formed at an edge portion of the flat plate, and a groove-shaped recess portion between the engaging portion 22a and the rib 26e serves as the spring housing portion 22. When a tip end of the recess portion of the spring housing portion 22 is closed, an edge side of the spring housing portion 22 protrudes toward the recess portion continuously with a tip end side to form the engaging portion 22a. The locking portion 17a of the fixed-side support arm 17 of the torsion coil spring 10 is housed in the spring housing portion 22, and the coil spring 10 is held by a biasing force of the coil spring 10 such that the locking portion 17a is engaged with the engaging portion 22a in a torsional compressed state. As shown in FIGS. 3B and 3D, the engaging portion 22a is inclined such that a side surface (back surface side) of the locking portion in a removal direction decreases in protruding amount as approaching the boss portion 15 from the tip end. That is, the engaging portion 22a is inclined such that the protruding amount of the side surface of the locking portion 17a in the removal direction decreases in a direction from the tip end toward the coil portion 18.

In the spring housing portion 22, the tip end of the recess portion may pass through the edge portion and be removed. In this case, the curved relief portion 17b of the fixed-side support arm 17 is not necessarily required, and the pressing portion 17c may be formed by bending from the tip end of the linear locking portion 17a.

When the chain tensioner 7 is delivered to the vehicle manufacturer, the chain tensioner 7 is not subjected to the biasing force of the torsion coil spring 10. As shown in FIGS. 1 to 3D, the torsion coil spring 10 is fitted into the boss portion 15 of the lever 9 with the fixed-side support arm 17 as a start. Accordingly, in the torsion coil spring 10, the fixed-side support arm 17 is positioned on a back side of the boss portion 15 close to the coupling portion 26. The fixed-side support arm 17 is slightly bent and deformed, the locking portion 17a thereof is housed in the spring housing portion 22 of the lever 9, the curved relief portion 17b avoids a thick portion of the tip end of the spring housing portion, and the pressing portion 17c protrudes to a side opposite to the coupling portion 26 of the lever, so that the torsion coil spring 10 is supported by the lever 9. Therefore, the torsion coil spring 10 is maintained in a state in which the fixed-side support arm 17 is housed in the spring housing portion 22 by the above-described bending deformation, and is held in the torsional compressed state (before the spring is released) in the lever 9 by cooperation of the lever-side support arm 19 abutting against the contact portion 21 of the lever.

The chain tensioner 7 is attached to the chain transmission device 1 by inserting the pivot pin 13a into the pivot hole 13 and fixing the chain tensioner 7 to the chain case 6. At this time, the tensioner 7 can be easily attached since the biasing force of the torsion coil spring 10 is cancelled in the lever 9.

Figure 5A:
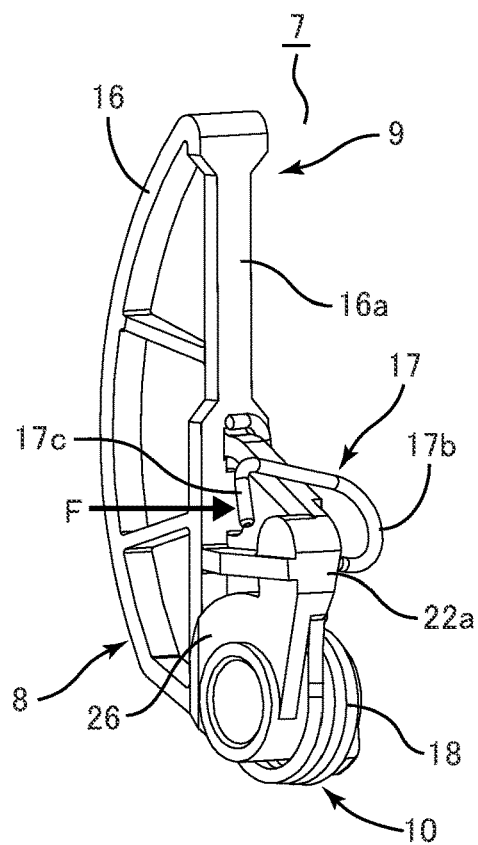
FIG. 5A is a perspective view of the chain tensioner when viewed from the front surface side, and shows a state in which the torsion coil spring of the chain tensioner is being released.
Figure 5B:
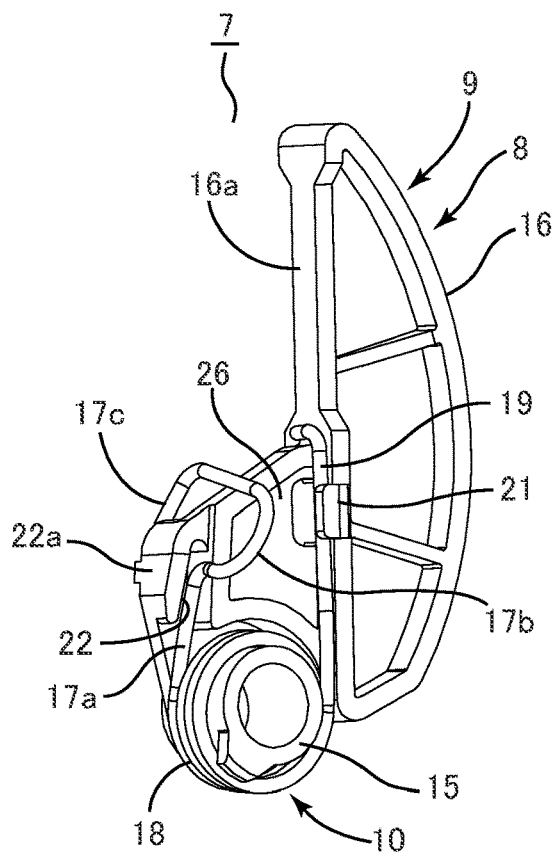
FIG. 5B is a perspective view of the chain tensioner when viewed from the back surface side, and shows the state in which the torsion coil spring of the chain tensioner is being released.
Figure 5C:
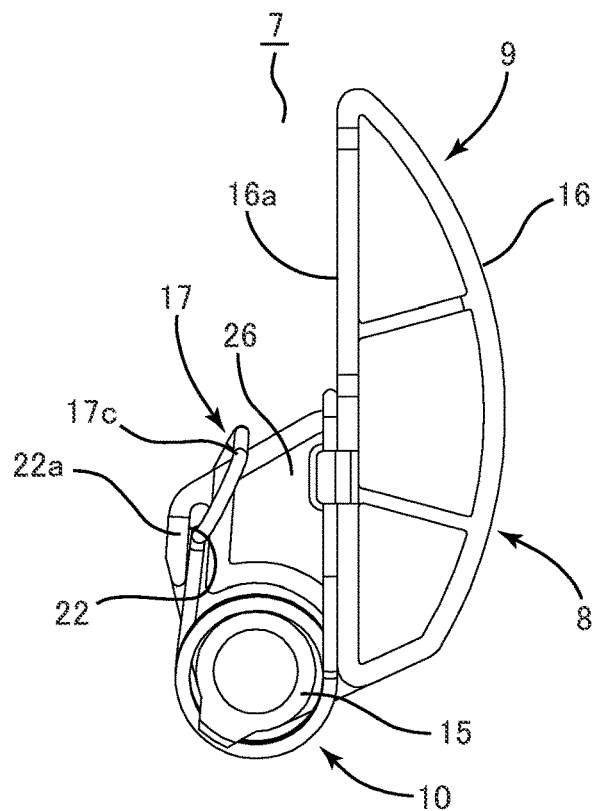
FIG. 5C is a front view of the chain tensioner when viewed from the back surface side, and shows the state in which the torsion coil spring of the chain tensioner is being released.
Figure 5D:
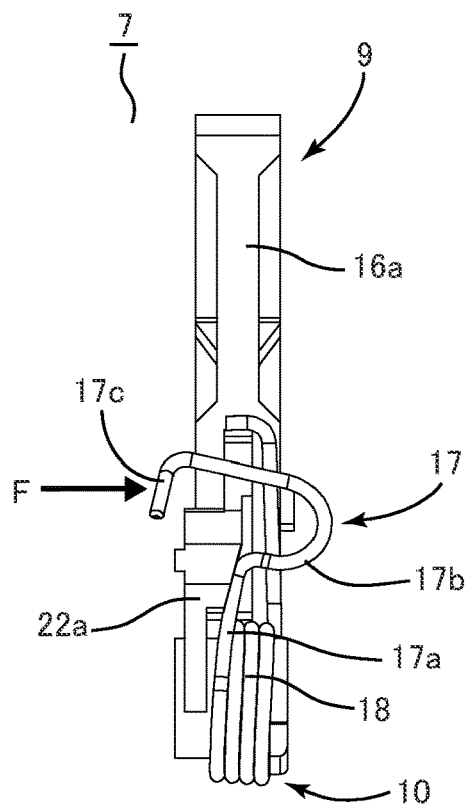
FIG. 5D is a bottom view of the torsion coil spring of the chain tensioner in the state of being released.

In order to bring the chain transmission device 1 into the use state, it is necessary to release the locking of the biasing force of the torsion coil spring 10. As shown in FIGS. 5A to 5D, a predetermined pressing force F is applied to the pressing portion 17c of the torsion coil spring 10, so that the fixed-side support arm 17 is deformed against the biasing force of the torsion coil spring 10. As a result, the locking portion 17a is removed from the spring housing portion 22, and the above-mentioned locking of the fixed-side support arm 17 of the torsion coil spring 10 in the lever 9 is released. At this time, as shown in FIG. 5D, since the engaging portion 22a of the spring housing portion is inclined in accordance with the deformation of the locking portion 17b, the locking portion 17a can be pulled out of the spring housing portion 22 at a small pull-out angle. Accordingly, the pressing force F is small, the deformation and displacement of the torsion coil spring 10 due to the pressing force are small, and a posture of the torsion coil spring 10 in the use state can be prevented from being displaced improperly.

When the locking of the torsion coil spring 10 is released, the fixed-side support arm 17 abuts against the contact portion 20 of the chain case 6. At this time, since the pressing force F is applied to the fixed-side support arm 17, the support arm 17 is easily slipped in a direction of the pressing force. However, since the contact portion 20 has the tapered surface 20b in the direction of the pressing force, the support arm 17 abuts against the tapered surface and moves to the flat spring contact surface 20a which is a regular position. As a result, the fixed-side support arm 17 abuts against the spring contact surface 20a of the contact portion, the fixed-side support arm 17 abuts against the contact portion 20 at the regular position, so that the torsion coil spring 10 applies the biasing force of the torsion coil spring 10 to the lever 9 in a regular state.

In this state, the torsion coil spring 10 applies the biasing force to the lever 9 between the torsion coil spring 10 and the contact portion 20, and the lever 9 is in a use state in which the sliding contact surface 16 applies tension to the chain 5. In the use state, the chain tensioner 7 is brought into sliding contact with the slack side of the chain 5 by the predetermined biasing force, and the chain transmission device 1 is avoided from generating problems such as vibration and tooth skipping, thereby maintaining normal rotation.

The pressing force F applied on the pressing portion 17*c* is generally applied by human power in a state where the case is removed. In a state where the locking of the torsion coil spring 10 is released and the chain tensioner 7 is in the use state by the spring 10 acting on the lever 9, the chain cover is attached to the chain case 6.

Next, a partially modified embodiment will be described with reference to FIGS. 6A to 7E. The present embodiment is characterized by a method for pressing the pressing portion 17*c*, that is, a method for releasing the torsion coil spring 10, the same portions as those of the previous embodiment are denoted by the same reference numerals, and the description of the configuration is omitted.

Figure 6A:
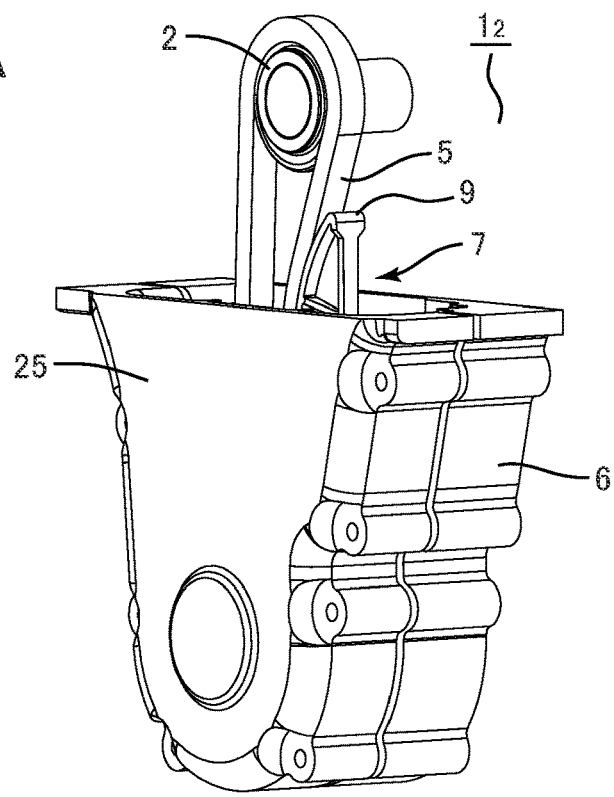
FIG. 6A is a perspective view showing a chain transmission device according to a partially modified embodiment.
Figure 6B:
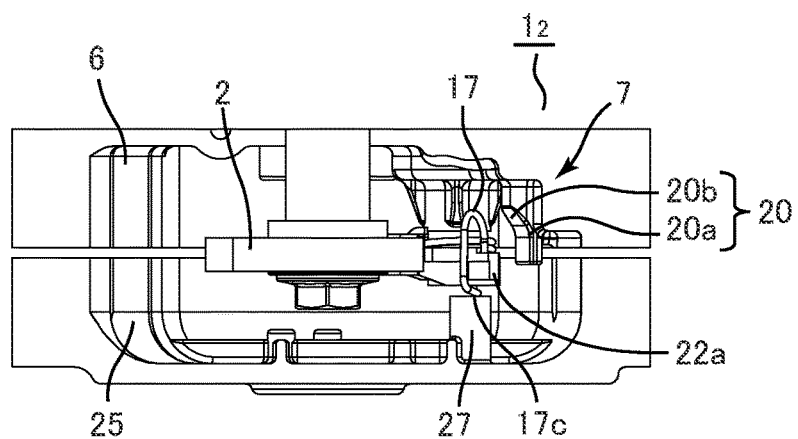
FIG. 6B is a cross-sectional view showing the chain transmission device according to the partially modified embodiment, and shows a state in which a torsion coil spring is being released.
Figure 6C:
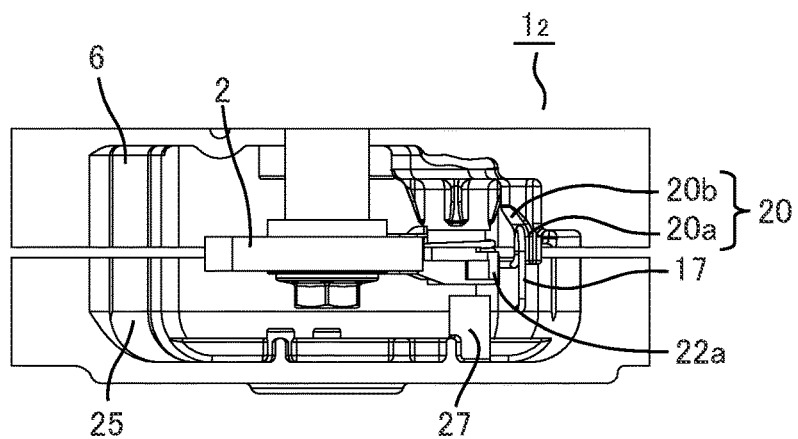
FIG. 6C is a cross-sectional view showing the chain transmission device according to the partially modified embodiment, and shows a state after the spring is released.

As shown in FIGS. 6A to 6C, in a chain transmission device 1$_2$, a chain cover (engine cover, case cover) 25 is attached to cover an open portion of the chain case 6. The chain cover 25 has a depth substantially equal to that of the chain case 6, and is attached to the chain case 6 by approaching the case 6 from an open side of the chain case 6 and being fastened with a plurality of bolts. FIGS. 6A to 6C show a state in which the chain cover 25 is approaching and being fastened to the chain case 6. The chain cover 25 is provided with a releasing protrusion 27 protruding inward from a bottom surface of the chain cover 25. The releasing protrusion 27 may be a dedicated protrusion that corresponds to a pressing position of the pressing portion 17*c* and presses the pressing portion 17*c*, or may also be used as a component having another function such as an engine governor.

Figure 7A:
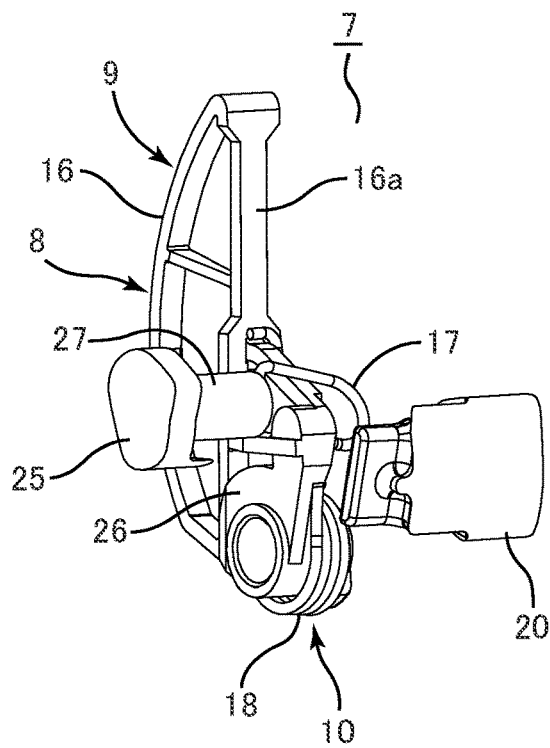
FIG. 7A is a perspective view showing a chain tensioner portion of the chain transmission device shown in FIG. 6A.
Figure 7B:
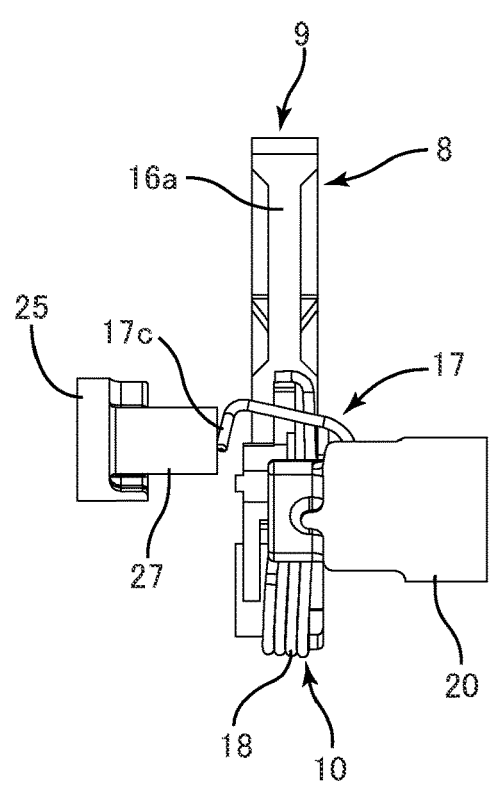
FIG. 7B is a rear view showing the chain tensioner portion of the chain transmission device shown in FIG. 6A.
Figure 7C:
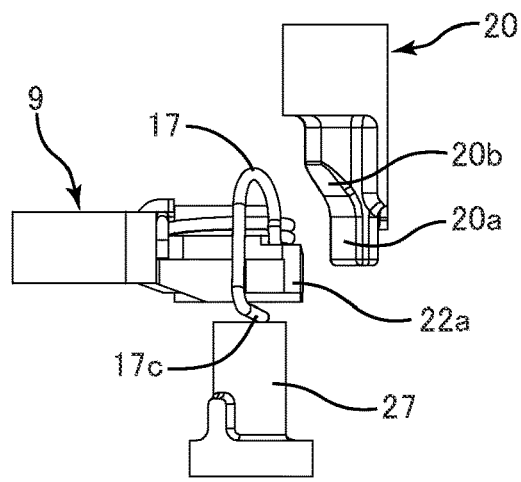
FIG. 7C is a side view showing the chain tensioner portion of the chain transmission device shown in FIG. 6A.
Figure 7D:
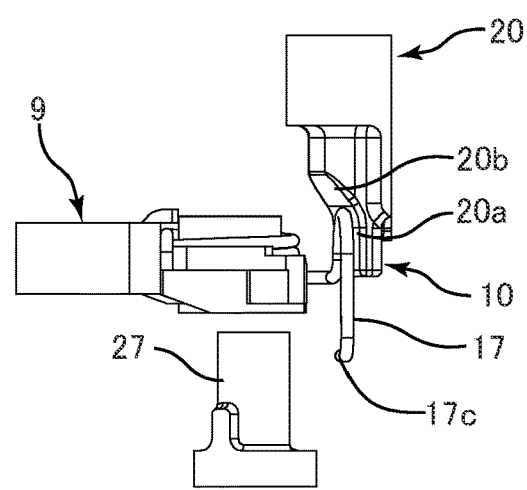
FIG. 7D is a side view showing the chain tensioner portion of the chain transmission device shown in FIG. 6A, and shows the state after the torsion coil spring is released.

In the chain transmission device 1$_2$, at the time of delivery, as described above, the torsion coil spring 10 is in a state in which the locking portion 17*a* is housed in the spring housing portion 22 of the lever 9 and a compression force is received by the lever 9. When the chain transmission device 1$_2$ is brought into the use state, the chain case 6 is covered with the chain cover 25. At this time, as shown in FIGS. 6B and 7A to 7E, first, the releasing protrusion 27 of the chain cover 25 comes into contact with the pressing portion 17*c* of the torsion coil spring 10. Then, when the chain cover 25 is further fastened to the chain case 6 and the releasing protrusion 27 presses the pressing portion 17*c*, as shown in FIG. 7D, the locking portion 17*a* of the torsion coil spring 10 is removed from the housing of the spring housing portion 22, the biasing force thereof is released, and the fixed-side support arm 17 abuts against the spring contact portion 20 of the chain case 6 by the torsional biasing force.

Figure 7E:
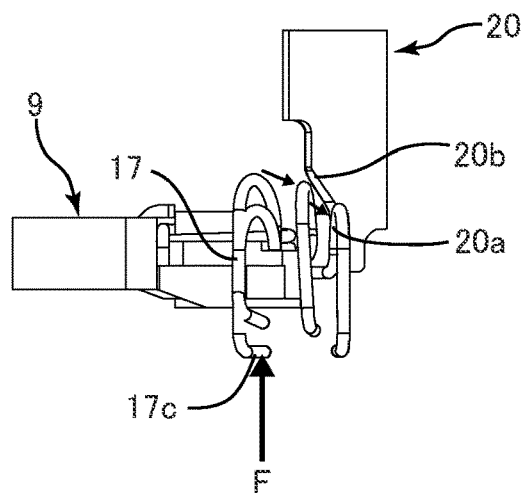
FIG. 7E is a side view showing the chain tensioner portion of the chain transmission device shown in FIG. 6A, and shows states before and after the spring is released.
Figure 8A:
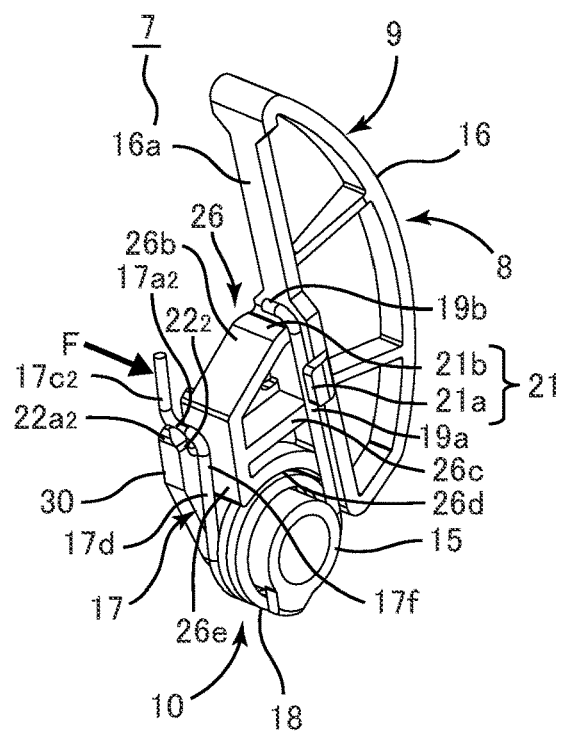
FIG. 8A is a perspective view of a partially modified chain tensioner when viewed from a front surface side.
Figure 8B:
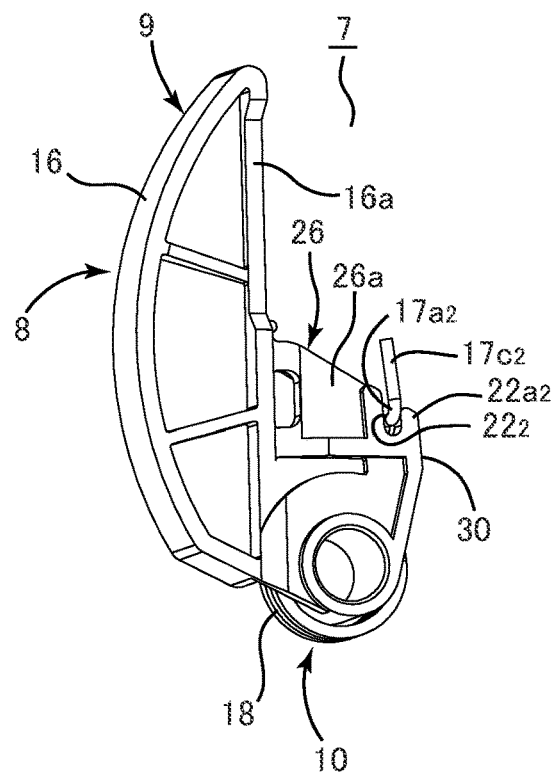
FIG. 8B is a perspective view of the partially modified chain tensioner when viewed from a back surface side.
Figure 8C:
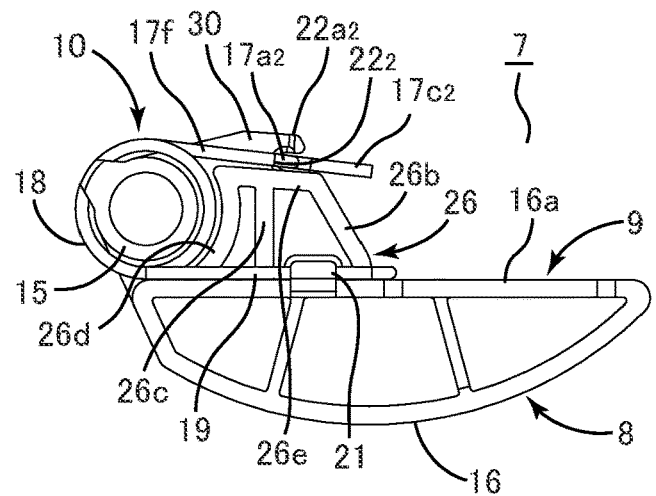
FIG. 8C is a front view of the partially modified chain tensioner.
Figure 8D:
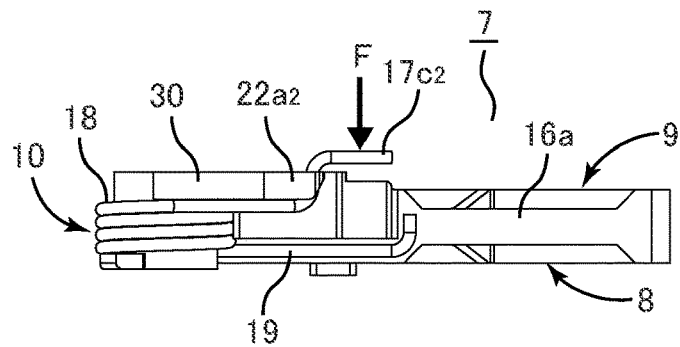
FIG. 8D is a plan view of the partially modified chain tensioner.
Figure 8E:
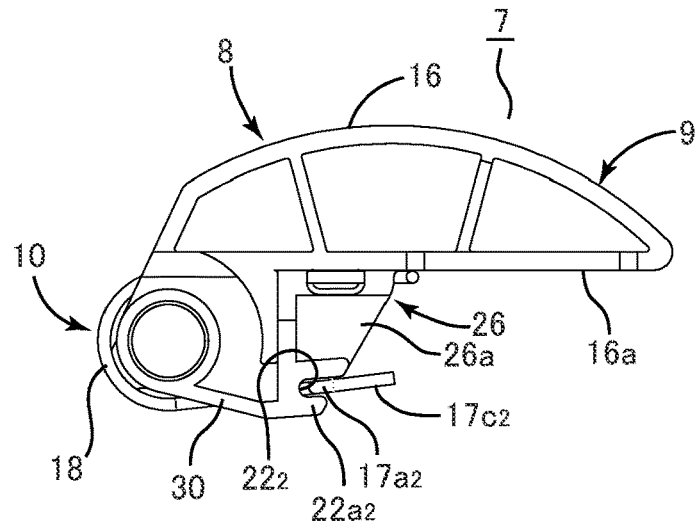
FIG. 8E is a rear view of the partially modified chain tensioner.

At this time, since the engaging portion 22*a* of the spring housing portion 22 is formed of the inclined surface (see FIG. 5D), a depth of the fixed-side support arm 17 at a tip end portion (a side away from the boss portion) of the engaging portion 22*a* in the spring housing portion 22 is ensured, and the locking portion 17*a* can be stably locked. At the same time, the pull-out angle of the fixed-side support arm 17 for releasing the biasing force is sufficiently small and the deformation of the fixed-side support arm 17 is also small. As a result, the locking of the fixed-side support arm 17 is reliably released by a stroke of a pressing force accompanying the attachment of the chain cover 25, and the fixed-side support arm 17 abuts against the spring contact portion 20 by the released torsional biasing force. In this state, as shown in FIG. 7E, the locking portion 17*a* is released from the spring housing portion 22 by a pressing force F from the releasing protrusion 27, and the abutting of the releasing protrusion 27 against the pressing portion 17*c* is released. However, the engaging portion 17*a* is bent and deformed even when the pull-out angle is small, and as shown by an arrow, the fixed-side support arm 17 firstly abuts against the tapered surface 20*b* of the spring contact portion 20 due to a force (inertia force) of the released torsional biasing force, slides down the tapered surface due to the inclination of the tapered surface and the spring biasing force, and is guided to the flat spring contact surface 20*a* which is a regular spring receiving surface.

As a result, the torsion coil spring 10 is supported by the spring contact portion 20 in the regular state with little displacement such as slippage during the spring release and applies a normal biasing force to the lever 9, and the chain tensioner 7 appropriately applies the tension to the chain 5.

In the present embodiment, accompanying the attachment of the chain cover 25, the locking of the torsion coil spring 10 is automatically released, and the chain tensioner can be reliably prevented from operation failure due to forgetting to release the torsion coil spring 10. In addition, a pressing operation can be reliably performed on the pressing portion 17*c* of the fixed-side support arm with a sufficient force and stroke, the releasing protrusion can be released from the pressing portion at an appropriate fixed position, the torsion coil spring can be maintained in an appropriate state, and appropriate tension biasing can be performed on the chain by the chain tensioner.

A further modified embodiment will be described with reference to FIGS. 8A to 8E. The present embodiment is different from the previous embodiments in a shape of the torsion coil spring and a shape of the locking portion of the spring, and the other portions are the same, and thus the same components are denoted by the same reference numerals and the description thereof will be omitted.

The chain tensioner 7 includes the lever 9 and the torsion coil spring 10. The lever 9 includes the arched portion 8 having the sliding contact surface 16, the boss portion 15, and the coupling portion 26. The coil portion 18 of the torsion coil spring 10 is fitted into the boss portion 15, and the lever-side support arm 19 at one end of the torsion coil spring 10 abuts against the contact portion 21 of the lever 9. The extension portion 19*a* of the lever-side support arm 19 passes between the coupling portion 26 (intermediate rib 26*c*) and the spring outer stop portion 21*a*. The bent portion 19*b* at the tip end of the lever-side support arm 19 is engaged with the coupling portion 26 (edge rib 26*b*).

The coupling portion 26 includes a relatively thin flat plate 26*a* on the front surface side, and a plurality of ribs 26*b*, 26*c*, 26*d* extend from the flat plate 26*a* to the back surface side. The edge rib 26*b* at a tip end further serves as the coupling rib 26*e*, extends toward the boss portion 15, and is coupled to tip ends of the boss rib 26*d* surrounding the boss portion 15 and the intermediate rib 26*c*. Base end sides of the ribs 26*b*, 26*c*, 26*d* are connected to the linear portion 16*a* of the arched portion 8. Further, a protrusion portion 30 protrudes outward (toward a side opposite to the arched portion 8) from the coupling rib 26*e*, and a spring housing portion $22_2$ formed of a recessed groove portion is formed on a surface of the protrusion portion 30 rising away from the boss portion 15.

The boss portion 15 is formed at an end portion of the flat plate 26a of the coupling portion 26 in a manner of rising toward the back surface side, and the coil portion 10a of the torsion coil spring 10 is attached to surround an outer periphery of the boss portion 15 and fit between the boss portion 15 and the boss rib 26d. The fixed-side support arm 17 on a side close to the flat plate 26a of the torsion coil spring 10 includes an extension portion 17f extending from the coil portion 18 in a tangential manner, a locking portion $17a_2$ that is obtained by bending a tip end of the extension portion and extends in the axial direction of the coil portion, and a pressing portion $17c_2$ that is obtained by bending a tip end of the locking portion and extends outward and in parallel to the extension portion (in a direction away from the coil portion).

In the delivery state in which the chain tensioner 7 is held in a non-biased state, the extension portion 17f of the fixed-side support arm 17 of the torsion coil spring 10 extends along a side surface of the protrusion portion 30, the locking portion $17a_2$ is housed in the spring housing portion $22_2$, and the pressing portion $17c_2$ extends outward (in a direction away from the coil portion) on the front surface side of the lever 9. In this state, the torsional biasing force of the torsion coil spring 10 is locked by the locking portion $17a_2$ abutting against an engaging portion $22a_2$ on an outer side of the housing portion $22_2$, and is cancelled in the lever 9 by cooperation of the lever-side support arm 19 abutting against the contact portion 21. The spring housing portion $22_2$ may not necessarily be formed in a recessed groove shape, and may be a spring housing portion that is recessed with respect to the engaging portion $22a_2$ since the engaging portion $22a_2$ is formed in a convex portion shape protruding with respect to the spring housing portion.

When the pressing force F directed from the front surface side to the back surface side is applied to the pressing portion $17c_2$, the fixed-side support arm 17 of the torsion coil spring 10 bends and deforms the extension portion 17f to remove the locking portion $17a_2$ from the spring housing portion $22_2$. As a result, the engagement of the locking portion $17a_2$ with the engaging portion $22a_2$ is released, and the fixed-side support arm 17 of the torsion coil spring 10 abuts against the contact portion 20 of the chain case 6 by the torsional biasing force of the torsion coil spring 10. At this time, the contact portion 20 is formed of the flat spring contact surface 20a and the tapered surface 20b as described above, the locking portion $17a_2$ is guided to the spring contact surface 20a, and the fixed-side support arm 17 is received by the spring contact portion 20 in the regular state (see FIGS. 6A to 7E). Accordingly, the torsion coil spring 10 applies the biasing force to the lever 9 to bias the chain 5 of the chain transmission device 1 with tension via the sliding contact surface 16. The pressing force F applied to the pressing portion $17c_2$ may be applied by a human hand, a force when the chain cover is attached, or any other elements.

The locking portion in the fixed-side support arm of the torsion coil spring is housed in the spring housing portion of the lever, and the torsional biasing force of the torsion coil spring is received by the locking portion abutting against the engaging portion, so that when the chain tensioner is not in a use state during delivery or the like, the chain tensioner can be maintained in a state where no tension is applied from the tensioner to the chain.

When the pressing force is applied to the pressing portion, the locking portion is removed from the spring housing portion, the locking of the locking portion due to the engaging portion is released, the torsion coil spring abuts against the contact portion which is the fixing member and applies the torsional biasing force to the lever, and the chain tensioner applies the tension to the chain. At this time, since the locking of the locking portion can be released simply by pressing the pressing portion, it is possible to easily and reliably release the locking of the biasing force of the torsion coil spring without management of the stopper pin.

When the case cover is provided with the releasing protrusion and the chain case is covered with the case cover, the releasing protrusion can press the pressing portion to automatically release the locking of the locking portion due to the engaging portion, the chain tensioner can be reliably prevented from operation failure due to forgetting of the release of the engagement of the engagement portion, and a pressing operation of the pressing portion due to the releasing protrusion is a specified stroke, so that the torsion coil spring can be maintained in an appropriate state without influence of unreasonable deformation and displacement on the torsion coil spring, and the tension can be applied to the chain by the appropriate chain tensioner.

Since the contact portion which is the fixing member includes the tapered surface and the flat spring contact surface, when the pressing portion is pressed and the locking of the torsion coil spring is released, even when the fixed-side support arm is deformed or displaced due to the release, the fixed-side support arm slides down the tapered surface and is guided to the flat spring contact surface, and the torsion coil spring abuts against the contact portion at a regular position and applies the biasing force to the lever at an appropriate position.

Since the locking portion is a linear portion extending from the coil portion in a tangential manner, and the spring housing portion is a recess portion housing the linear locking portion, the locking portion is housed in the spring housing portion with a relatively long contact surface, and can stably maintain a locking state of the torsion coil spring, and by pressing the pressing portion, the locking portion is bent and deformed, and the locking due to the engaging portion can be easily released.

Since the locking portion is a portion that is obtained by bending the tip end of the extension portion and extends in the axial direction of the coil portion and the spring housing portion is formed on the rising surface in the coupling portion, in the fixed-side support arm, the locking portion is housed in the housing portion in a state in which the extension portion is not largely displaced, and the extension portion is easily bent by a relatively small pressing force to the pressing portion extending in a direction away from the coil portion, so that the locking portion can be reliably removed from the spring housing portion, and the locking due to the engaging portion can be easily released.

Since the engaging portion of the spring housing portion housing the linear locking portion is formed of a protruding portion and the engaging portion is inclined such that the protruding amount of the side surface of the protruding portion in the removal direction decreases in the direction from the tip end toward the coil portion, when the pressing force is applied to the pressing portion to pull out the locking portion from the engaging portion, the linear locking portion can be pulled out of the engaging portion at a relatively small pull-out angle, and the pressing force of the pressing portion is sufficiently small, the deformation and displacement of the fixed-side support arm at this time are also sufficiently small, and the biasing force can be applied to the lever at an appropriate position of the torsion coil spring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The invention is applicable for use in a chain tensioner.

What is claimed is:

1. A chain tensioner comprising:
   a lever including a sliding contact surface, which is configured to come into sliding contact with a chain, and a boss portion; and
   a torsion coil spring including a coil portion fitting into the boss portion, a fixed-side support arm extending from one end of the coil portion, and a lever-side support arm extending from the other end of the coil portion, wherein
   the fixed-side support arm is configured to abut against a contact portion which is a fixed member and the lever-side support arm is configured to abut against a contact surface provided on the lever to apply a biasing force of the torsion coil spring to the lever for applying tension to the chain via the sliding contact surface,
   the fixed-side support arm includes
   a locking portion, and
   a pressing portion,
   the lever includes a spring housing portion configured to house the locking portion, and an engaging portion integrally formed with the level and configured to lock the locking portion housed in the spring housing portion in a state in which a biasing force is applied,
   the fixed-side support arm is configured to move from a first position to a second position, the first position being a position where the locking portion is housed in the spring housing portion and is locked by the engaging portion, the second position being a position where the locking of the locking portion by the engaging portion is released and the locking portion is removed from the spring housing portion, and
   the torsion coil spring is configured such that the fixed-side support arm moves in an unwinding direction of the torsion coil spring in response to a release of the locking of the locking portion by the engaging portion.

2. The chain tensioner according to claim 1, wherein
   the chain and the chain tensioner are housed in a chain case, and a releasing protrusion is provided on a case cover that covers an open portion of the chain case, and
   when the chain case is covered with the case cover, the releasing protrusion presses the pressing portion to release the locking of the locking portion with the engaging portion.

3. The chain tensioner according to claim 1, wherein the contact portion has a tapered surface, which has a downward gradient toward a side opposite to a pressing direction to the pressing portion, and a flat spring contact surface continuous with a lower end of the tapered surface.

4. The chain tensioner according to claim 1, wherein
   the locking portion is formed of a linear portion extending from the coil portion in a tangential manner,
   the spring housing portion is formed of a recess portion that houses the linear portion, and
   the pressing portion is bent from the locking portion and extends beyond the engaging portion to a side opposite to the spring housing portion.

5. The chain tensioner according to claim 1, wherein
   the locking portion is formed of a portion that is obtained by bending a tip end of an extension portion extending from the coil portion in a tangential manner and extends in an axial direction of the coil portion,
   the spring housing portion is formed on a rising surface of a coupling portion that couples an arched portion having the sliding contact surface to the boss portion, and
   the pressing portion is formed of a portion that is obtained by bending a tip end of the locking portion beyond the engaging portion and extends in a direction away from the coil portion.

6. The chain tensioner according to claim 4, wherein the engaging portion is formed of a protruding portion that protrudes to cover a spring biasing side of the spring housing portion, and
   the engaging portion is inclined such that a protruding amount of a side surface of the locking portion in a removal direction decreases in a direction from a tip end toward the coil portion.

* * * * *